United States Patent [19]

Scheckenbach et al.

[11] Patent Number: 5,691,427
[45] Date of Patent: Nov. 25, 1997

[54] PROCESS FOR THE SURFACE OXIDATION OF POLYARYLENE THIOETHERS

[75] Inventors: Helmut Scheckenbach, Langen; Andreas Schleicher, Beselich; Jörg von Eysmondt, Hofheim; Georg Frank, Tübingen, all of Germany

[73] Assignee: Hoechst Aktiengesellschaft, Germany

[21] Appl. No.: 571,751

[22] Filed: Dec. 13, 1995

[30] Foreign Application Priority Data

Dec. 14, 1994 [DE] Germany .............. 44 44 442.7

[51] Int. Cl.$^6$ .................................................. C08F 283/00
[52] U.S. Cl. ........................................ 525/537; 528/373
[58] Field of Search ........................... 528/373; 525/537

[56] References Cited

U.S. PATENT DOCUMENTS 3,793,256  2/1974  Scoggin.
4,383,080  5/1983  Dupree .................................. 525/537
4,769,426  9/1988  Iwasaki et al. ....................... 528/388
5,423,902  6/1995  Strutz et al. ......................... 528/373
5,496,917  3/1996  Fleischer et al. .................... 528/373

FOREIGN PATENT DOCUMENTS 0 091 088  10/1983  European Pat. Off..
0 623 639  11/1994  European Pat. Off..
0 623 640  11/1994  European Pat. Off..
94/25133  11/1994  WIPO.

*Primary Examiner*—Mark D. Sweet
*Attorney, Agent, or Firm*—Connolly & Hutz

[57] ABSTRACT

In the process for the surface oxidation of polyarylene thioethers, the surface of the material to be oxidized is brought into contact with an ozone-containing gas or a liquid.

The materials prepared by the process can be used in aircraft construction, automobile construction and chemical apparatus construction.

16 Claims, No Drawings

PROCESS FOR THE SURFACE OXIDATION OF POLYARYLENE THIOETHERS

DESCRIPTION

The invention relates to a process for the surface oxidation of moldings, granules or powders of polyarylene thioethers by means of ozone to increase the resistance to heat and chemicals.

Polyarylene thioethers are known. In addition to a good resistance to heat, they also have a good resistance to chemicals. However, for many applications a higher resistance to heat or a better resistance to chemicals is necessary. This can be achieved, for example, by oxidation of the polyarylene sulfide polymer chains to polyarylene sulfoxide or sulfone (DE-A 43 14 735, DE-A 43 14 736, DE-A 43 14 737). A disadvantage is, however, that such polymers in general can no longer be processed thermoplastically by injection molding or extrusion by the conventional route.

For many applications it is sufficient to oxidize only the surface of the shaped articles. Surface oxidation by means of hydrogen peroxide and acetic acid or methylene chloride and m-chlorobenzoic acid is known (A. Kaul and K. Udipi; Macromolecules 1989, 22, 1201–1207). Surface oxidation of polyarylene sulfides by means of reagents is described generally in U.S. Pat. Nos. 4,251,575; 0,051,690; 4,337,660. Surface oxidation of ultra-thin films by means of plasma treatment is furthermore known (JP 88-200838).

Surface oxidation by means of reagents is time-consuming and requires special reaction vessels. Furthermore, the reagents must be disposed of after the oxidation. Plasma treatment requires a high expenditure on apparatus.

The object of the invention was to avoid the disadvantages mentioned.

This has been achieved by using ozone as the oxidizing agent.

The invention relates to a process for surface oxidation of a polyarylene thioether, in which the surface of the material to be oxidized is brought into contact with an ozone-containing stream of gas or a liquid in which ozone is dissolved. The materials employed are, for example, moldings, granules or powders. Oxidation of the polyarylene thioethers on the surface of the solid takes place here. Depending on the ozone concentration, the sulfur bridges of the polyarylene thioethers are oxidized to sulfoxide and/or to sulfone. A higher degree of oxidation is equivalent here to a higher resistance to heat and chemicals.

This process is a simple, rapid and inexpensive method for surface oxidation of polyarylene thioethers.

The surface oxidation can be carried out in gases, preferably in ozone/oxygen mixtures or ozone/air mixtures, and in liquids, in particular with ozone dissolved in water or in acetic acid at various concentrations, preferably 10 to 100%.

Surface oxidation can be achieved with any ozone concentration, and ozone concentrations of 1 g/m³ to 200 g/m³ are particularly suitable. Ozone concentrations <1 g/m³ lead to long times. At ozone concentrations >200 g/m³, there is the risk of spontaneous explosion of the ozone.

Polymers which can be used are linear and/or branched polyarylene systems with the recurring unit of the formula (I) which contain at least one thioether group

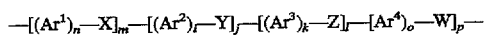

in which $Ar^1$, $Ar^2$, $Ar^3$, $Ar^4$, W, X, Y and Z independently of one another are identical or different. The indices n, m, i, j, k, l, o and p independently of one another are zero or the integers 1, 2, 3 or 4, and their sum must be at least 2. $Ar^1$, $Ar^2$, $Ar^3$ and $Ar^4$ in the formula (I) are arylene systems having 6 to 18 carbon atoms. W, X, Y and Z are divalent linking groups chosen from $—SO_2—$, $—S—$, $—SO—$, $—CO—$, $—CO_2—$ and alkylene and alkylidene groups having 1 to 6, preferably 1 to 4, carbon atoms.

Suitable polymers are, for example, polyarylene thioethers with recurring units of the formulae (II)–(VI), the syntheses of which are described, for example, in Chimia 28 (1974), 567:

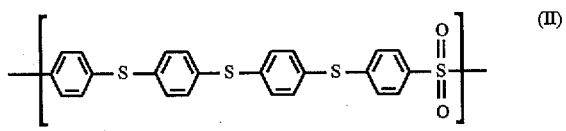

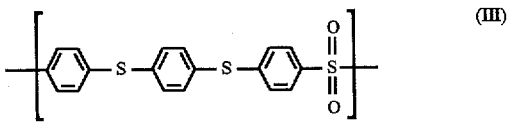

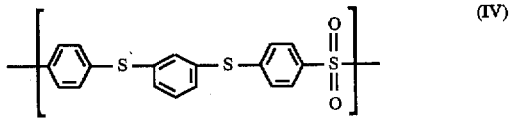

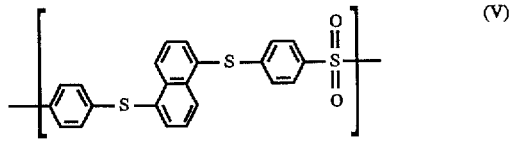

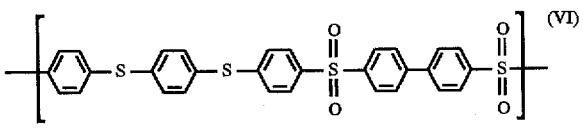

and polyarylene thioethers with recurring units of the formula (VII) (U.S. Pat. No. 4,016,145)

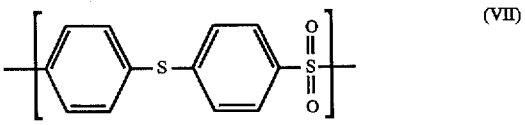

The preferred polyarylene thioether is polyphenylene sulfide (PPS) with the recurring unit of the formula (VIII) (cf. Ullmann's Encyclopedia of Industrial Chemistry, Volume A21, Weinheim-N.Y. 1992, page 463).

Polyarylene thioethers which have an average molecular weight of 4,000 to 200,000, preferably of 10,000 to 150,000, in particular 25,000 to 100,000, determined by GPC, are in general suitable for the invention.

The polyarylene thioethers can also comprise pulverulent reinforcing agents, such as chalk, talc, clay, mica, and/or fibrous reinforcing agents, such as glass fibres and carbon fibres, whiskers, as well as further customary additives and processing auxiliaries, for example lubricants, release agents, antioxidants and UV stabilizers. Such components are used in aircraft and automobile construction and in chemical apparatus construction.

EXAMPLES

1. Surface Oxidation of Moldings

General Experimental Conditions

Generation of ozone from dry oxygen with a commercially available ozone generator (Fischer 503, Fischer Labortechnik, Meckenheim, Federal Republic of Germany) via corona discharge. Ozone analysis (reactor intake/output) via a Fischer Ozotron 23 ozone analyzer.

Samples of material were introduced into a glass tube which could be closed with a frit from both sides. Ozone-containing oxygen then flowed through the glass tube.

The surface of the samples of material was analyzed by ESCA (Electron Spectroscopy for Chemical Analysis)

A polyphenylene sulfide having a molecular weight $M_w$ of about 90,000 g/mol was used as the polyarylene sulfide.

|  | Example | |
|---|---|---|
|  | 1a<br>PPS pipe<br>(diameter: 80 mm,<br>wall thickness:<br>3 mm) | 1b<br>PPS rod<br>(80*10*4 mm) |
| PPS weight [g] | 3 | 4 |
| Ozone intake [mg/m³] | 40,000 | 35,000 |
| Ozone output [mg/m³] | 39,300 | 34,400 |
| Ozone uptake [g] | 0.07 | 0.09 |
| Volume flow [m³/hour] | 0.05 | 0.05 |
| Temperature [°C.] | 25 | 25 |
| Test duration [hours] | 2 | 3 |
| Surface composition before ozone treatment [atom %] | 100% of PPS<br>0% of PPSO<br>0% of PPSO₂ | 100% of PPS<br>0% of PPSO<br>0% of PPSO₂ |
| Surface composition after ozone treatment [atom %] | 19.7% of PPS<br>26.5% of PPSO<br>53.9% of PPSO₂ | 4.3% of PPS<br>29.0% of PPSO<br>56.7% of PPSO₂ |

2. Properties of the Surface-Oxidized Shaped Articles

PPS bars according to Example 1b in the untreated and surface-oxidized state were subjected to the following storage in chemicals:

|  | untreated | surface-oxidized |
|---|---|---|
| Sulfuric acid (20% strength) at 180° C. for 96 h | − | + |
| Nitric acid (86% strength) at 23° C. for 1 h | − | + |
| Toluene at 150° C. for 24 h | − | + |
| Glycol (50% strength) at 180° C. for 96 h | − | + |

+: resistant, weight increase <3% or weight loss <0.5% and/or decrease in tear strength <15%
/: limited resistance, weight increase 3 to 8% or weight loss 0.5 to 3% and/or decrease in tear strength of 15 to 30%
−: not resistant, weight increase >8% or weight loss <3% and/or decrease in tear strength >30%.

PPS bars according to Example 1b in the untreated and surface-oxidized state were furthermore briefly exposed to heat such as takes place typically during soldering operations:

Parameters: 30 times per hour at 260° C. for 5 seconds.

It was found that the untreated PPS bars melted on the surface, while the surface-oxidized PPS showed no change.

3. Oxidation of Granules and Powders

General Experimental Conditions

Generation of ozone from dry oxygen with a commercially available ozone generator (Fischer 503, Fischer) via corona discharge PPS granules (1 mm particle size, sieve fraction) were introduced into a double-walled glass reactor (1.5 l) and mixed thoroughly in the dry state via a helical stirrer. Ozone was then introduced via a bottom valve in the reactor. The reactor jacket was cooled to 5° C.

PPS powder (20 µm particle size) was suspended in 50% strength aqueous acetic acid in the same reactor and the suspension was stirred intensively with a blade stirrer. The ozone was then introduced via a bottom valve in the reactor. The reactor jacket was cooled to 5° C. The intake and output concentrations of ozone were measured via commercially available analytical apparatuses (Fischer Ozotron 23, Fischer).

The surface of the material samples was analyzed by ESCA. In the case of the granules, the pure surface oxidation of the 1 mm particles was measured on the one hand, and on the other hand the total degree of oxidation was determined by finely grinding the particles and then measuring the oxidation.

|  | Example | |
|---|---|---|
|  | 3a<br>PPS granules<br>(1 mm) | 3b<br>PPS powder<br>(0.02 mm) |
| Suspension medium/solvent | — | 50% strength aqueous acetic acid |
| Stirrer speed [rpm] | 200 | 500 |
| Weight of PPS [g] | 400 | 216 |
| Ozone intake [mg/m³] (mean) | 52,000 | 55,000 |
| Ozone output [mg/m³] (mean) | 3,000 | 15,000 |
| Volume flow [m³/hour] | 0.1 | 0.05 |
| Ozone uptake [g] | 130 | 52 |
| Temperature [°C.] | 10–20 | 5–10 |
| Test duration [hours] | 2 | 3 |
| Surface composition before ozone treatment [atom %] | 100% PPS<br>0% PPSO<br>0% PPSO₂ | 100% PPS<br>0% PPSO<br>0% PPSO₂ |
| Surface composition after ozone treatment [atom %] | 22.1% PPS<br>27.7% PPSO<br>50.2% PPSO₂ | 10.5% PPS<br>74.4% PPSO<br>15.1% PPSO₂ |

We claim:

1. A process for surface oxidation of a material comprising a polyarylene thioether, which comprises bringing the surface of said material into contact with an ozone-containing fluid in which ozone is dissolved, and recovering, as the product of said process, a material comprising a polyarylene ether in which essentially only the surface of said material has been oxidized.

2. The process as claimed in claim 1, wherein said material comprises linear and/or branched polyarylene systems with the recurring unit of the formula (I) which contain at least one thioether group

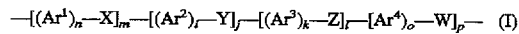

in which $Ar^1$, $Ar^2$, $Ar^3$, $Ar^4$, W, X, Y and Z independently of one another are identical or different, the indices n, m, i, j, k, l, o and p independently of one another are zero or the integers 1, 2, 3 or 4, and their sum must be at least 2, $Ar^1$, $Ar^2$, $Ar^3$ and $Ar_4$ in the formula (I) are arylene systems having 6 to 18 carbon atoms, and W, X, Y and Z are divalent linking groups chosen from —$SO_2$—, —S—, —SO—, —CO—, —$CO_2$— and alkylene and alkylidene groups having 1 to 6 carbon atoms.

3. The process as claimed in claim 2, wherein said material comprises polyphenylene sulfide.

4. The process as claimed in claim 1, wherein the polyarylene thioether has an average molecular weight of 4,000 to 200,000, determined by GPC.

5. The process as claimed in claim 1, wherein said fluid is a gas.

6. The process as claimed in claim 1, wherein said gas is a mixture comprising ozone and an oxygen-containing gas.

7. The process as claimed in claim 1, wherein said fluid is a liquid, and the liquid is water or acetic acid.

8. The process as claimed in claim 1, wherein the concentration of ozone in said ozone-containing fluid ranges from 1 $g/m^3$ to 200 $g/m^3$.

9. The process as claimed in claim 1, wherein, essentially only at the surface of said material, said ozone-containing fluid oxidizes sulfur bridges of the polyarylene thioether of said material to sulfoxide groups, sulfone groups, or a combination thereof.

10. The process as claimed in claim 1, wherein said material is a molding, granule, or powder.

11. The process as claimed in claim 2, wherein said alkylidene groups have from 1 to 4 carbon atoms.

12. The process as claimed in claim 4, wherein said average molecular weight is 10,000 to 150,000.

13. The process as claimed in claim 4, wherein said average molecular weight is 25,000 to 100,000.

14. A surface-oxidized molding, granule, or powder made by the process of claim 1.

15. An airplane part or chemical apparatus comprising a surface-oxidized shaped article which has been shaped from material surface-oxidized in accordance with the process of claim 1.

16. The process as claimed in claim 10, wherein, essentially only at the surface of said molding, granule, or powder, said ozone-containing fluid oxidizes sulfur bridges of the polyarylene thioether of said material to sulfoxide groups, sulfone groups, or a combination thereof.

* * * * *